R. O. BOARDMAN.
LINE CASTING MACHINE.
APPLICATION FILED NOV. 21, 1911.

1,076,478.

Patented Oct. 21, 1913.

5 SHEETS—SHEET 1.

WITNESSES:

INVENTOR
Robert O. Boardman
BY
P. T. Dodge
ATTORNEY

R. O. BOARDMAN.
LINE CASTING MACHINE.
APPLICATION FILED NOV. 21, 1911.

Patented Oct. 21, 1913
5 SHEETS—SHEET 2.

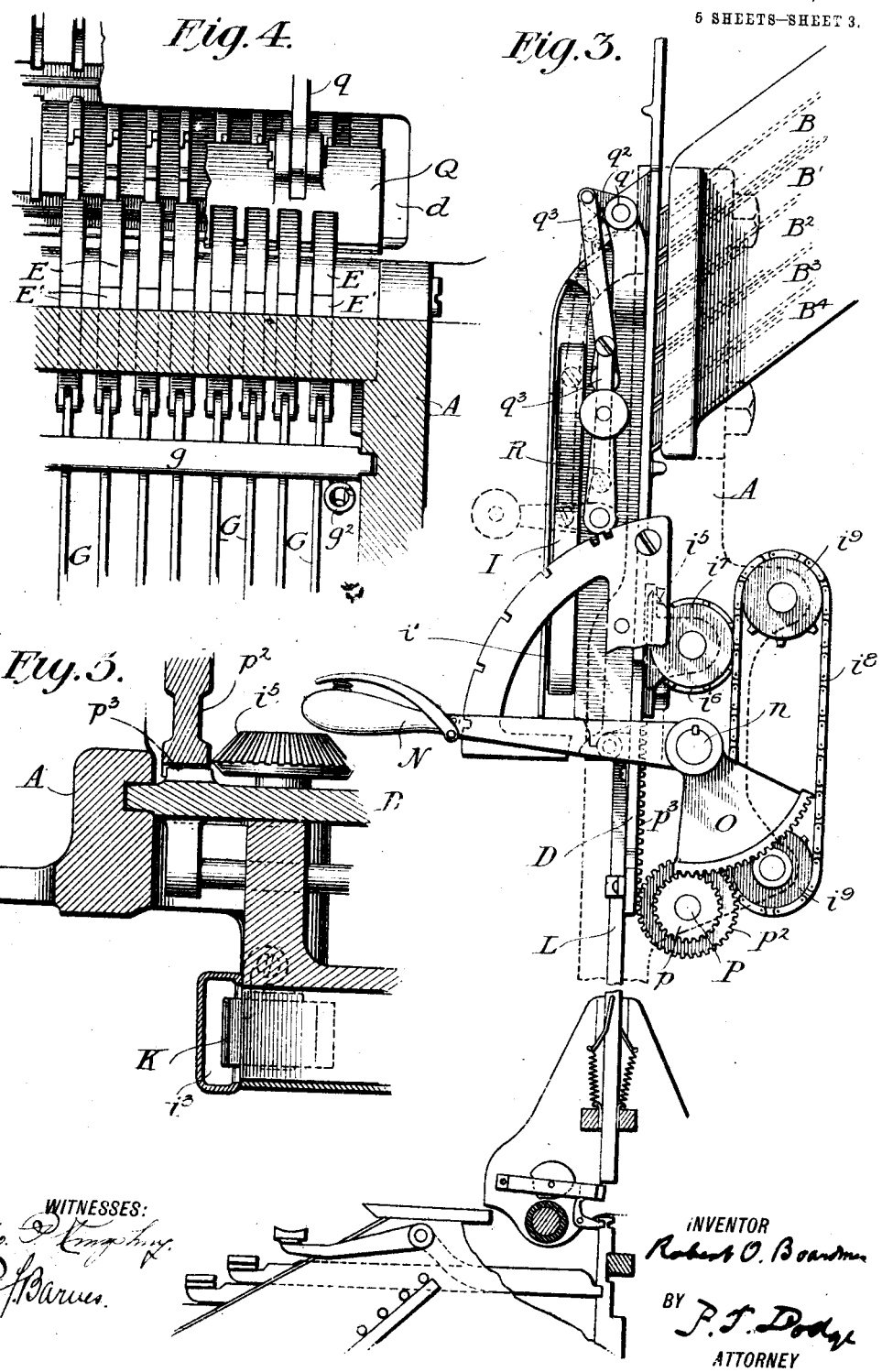

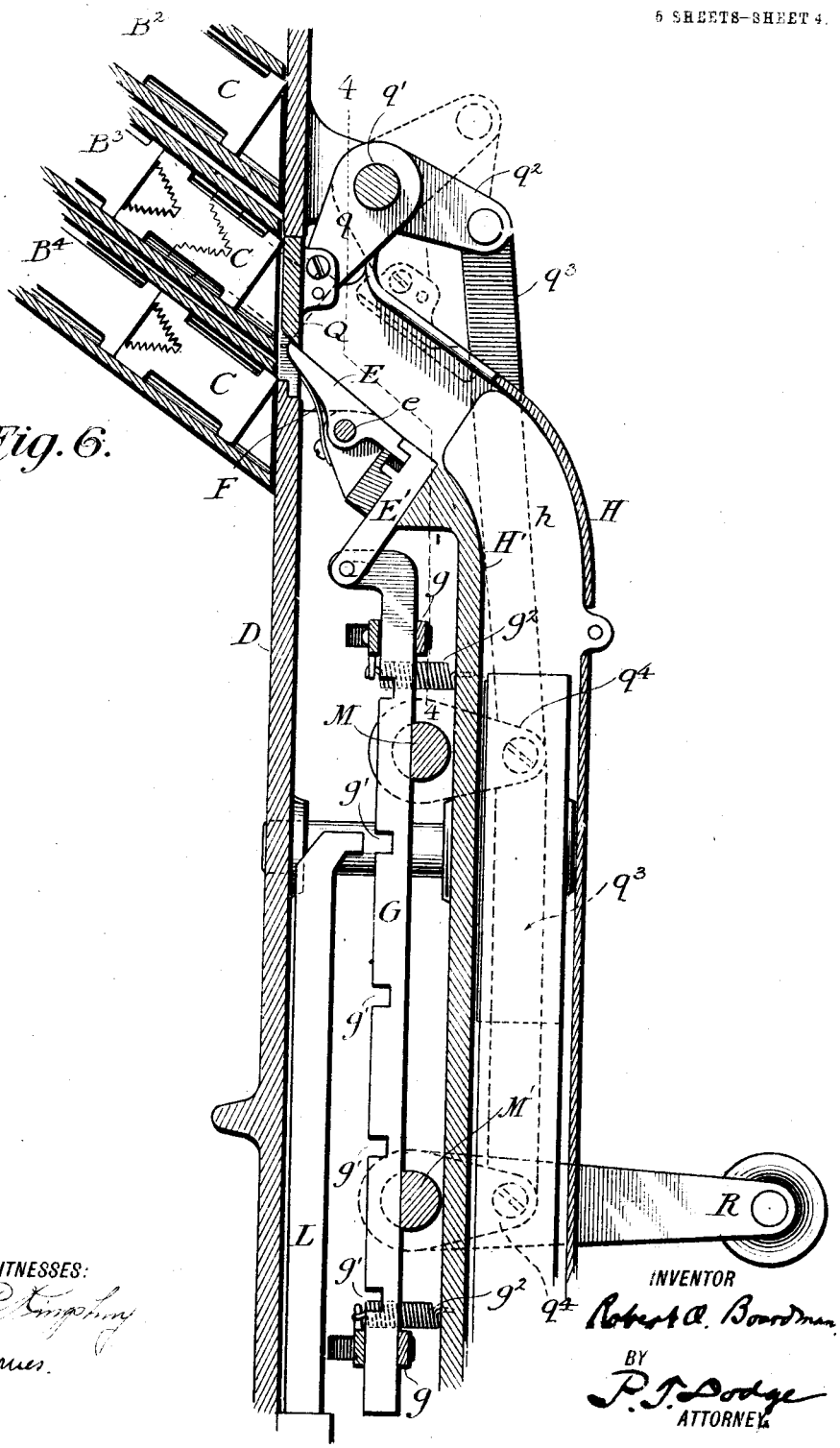

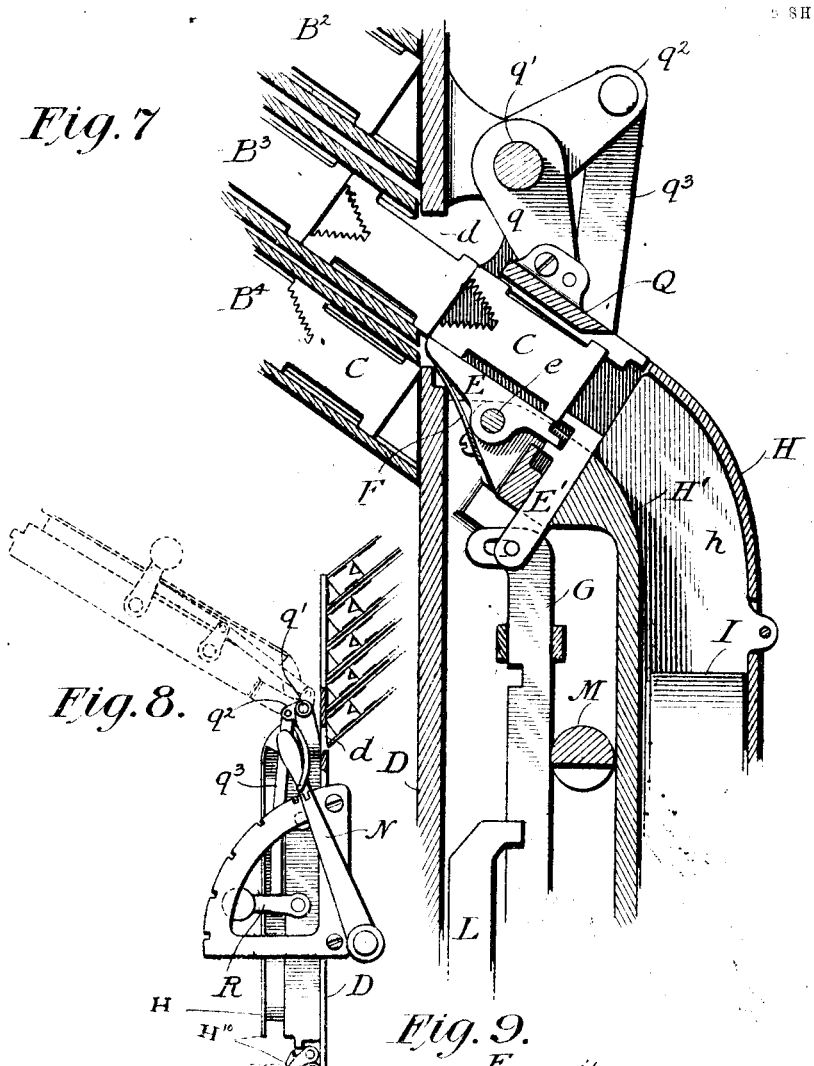

UNITED STATES PATENT OFFICE.

ROBERT O. BOARDMAN, OF GRAND RAPIDS, MICHIGAN, ASSIGNOR TO MERGENTHALER LINOTYPE COMPANY, A CORPORATION OF NEW YORK.

LINE-CASTING MACHINE.

1,076,478.  Specification of Letters Patent.  Patented Oct. 21, 1913.

Application filed November 21, 1911. Serial No. 661,512.

*To all whom it may concern:*

Be it known that I, ROBERT O. BOARDMAN, of Grand Rapids, county of Kent, and State of Michigan, have invented a new and useful Improvement in Line-Casting Machines, of which the following is a specification.

This invention has reference to line casting machines of the Mergenthaler class, in which circulating matrices representing individual characters, and stored in a magazine, are selected by a finger-key mechanism, composed temporarily in line, with suitable spaces, and the composed line presented to the face of a slotted mold to form characters on the edge of a type metal slug or linotype cast therein, the matrices being thereafter returned, through a distributing mechanism, to the magazine.

The invention relates more particularly to those machines in which a number of magazines, each containing a font or series of matrices, are employed, the organization being such that the matrices of any magazine may be brought into action at will. Heretofore these machines have been constructed with a series of stationary magazines, each provided with a series of escapements to discharge the matrices one at a time; and also with a series of magazines arranged to rise and fall in order to bring the selected magazine into operative position, these magazines being also provided each with a series of escapements.

My invention consists in a machine having a series of stationary magazines combined with a single series of escapements movable upward and downward at will, so that they may be caused to operate with any one of the magazines, the arrangement being such that all retained matrices are held within the magazines, in order that the escapements may be moved from one magazine to another at any moment.

Figure 1:
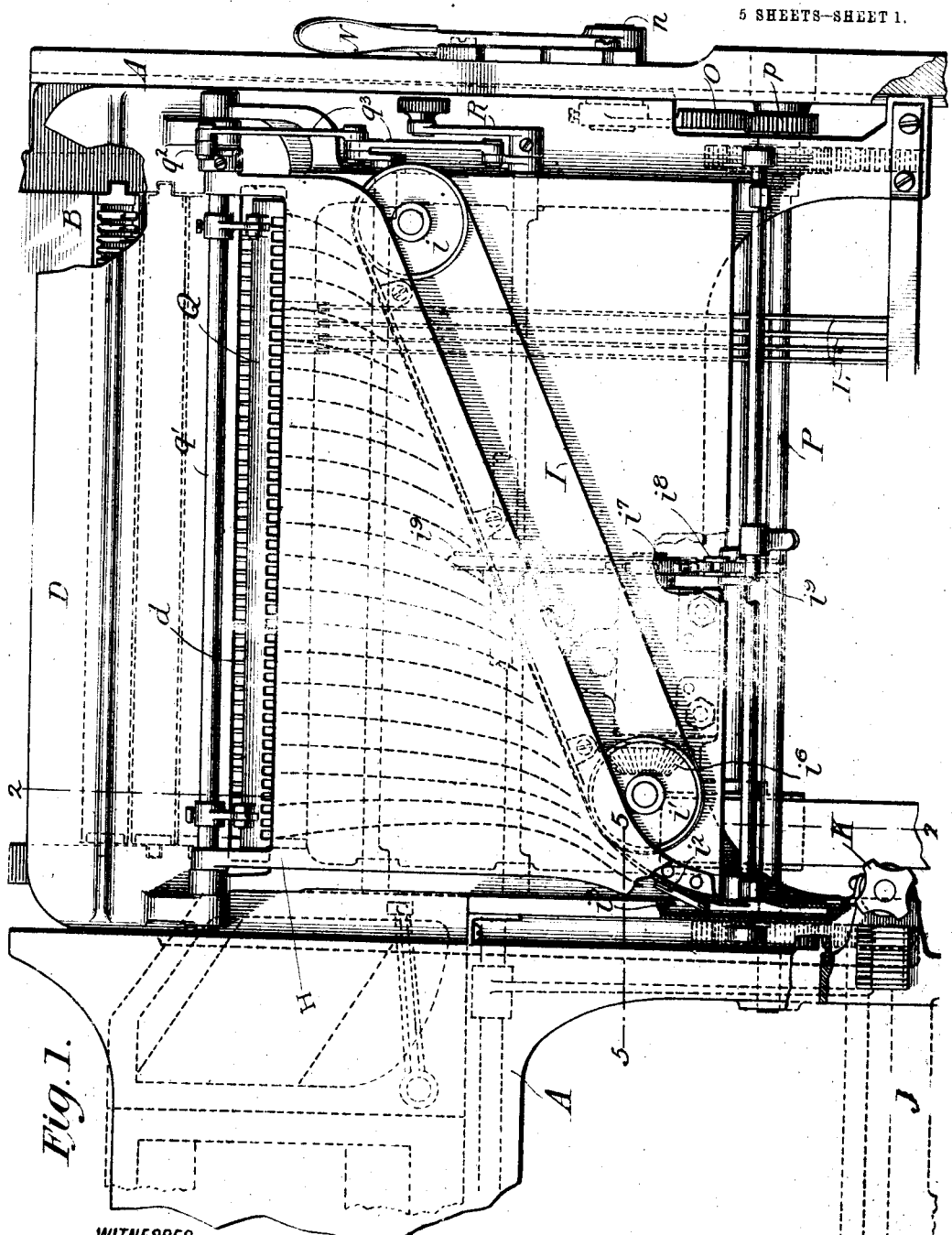
Figure 2:
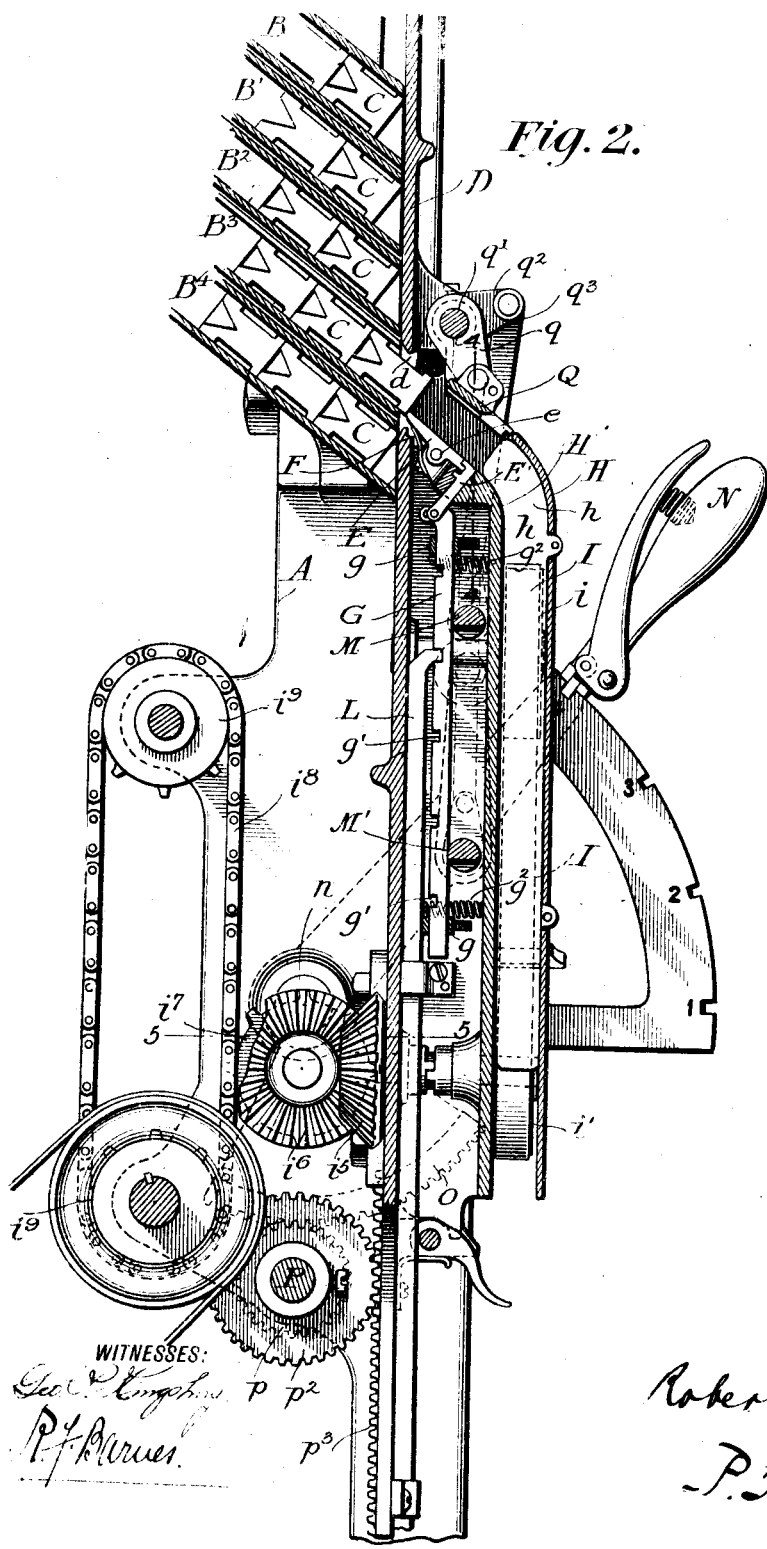

Referring to the drawings: Figure 1 is a front elevation of the magazines and the assembling mechanism in accordance with my invention. Fig. 2 is a vertical cross section from left to right on the line 2—2 Fig. 1. Fig. 3 is a side elevation of the parts shown in the preceding figures, looking from the right. Fig. 4 is a vertical section on the line 4—4 of Fig. 6. Fig. 5 is a horizontal section on the line 5—5 Figs. 1 and 2. Fig. 6 is a vertical section on the same line as Fig. 2, but with the parts in the position they occupy when the escapements and assembler are to be shifted vertically. Fig. 7 is a vertical section on a larger scale on the same line as Fig. 2, but with the escapements in the secondary position, with a matrix released from a magazine but still retained by the escapement. Fig. 8 is a side elevation looking from the right, illustrating the manner in which the assembler is hinged to swing upward. Fig. 9 is a perspective view, partly in section, showing the details of the escapement.

Referring to the drawings: A represents portions of the rigid main frame, which may be of any form and construction adapted to sustain the various operative parts.

B, B', etc., represent the inclined stationary magazines to carry the matrices, C. These magazines are seated at their sides in vertical plates forming a portion of the main frame, as shown in Figs. 1 and 3. Each magazine consists of two parallel, separated plates, provided in their inner faces with longitudinal grooves to receive and guide the upper and lower edges of the matrices, which are delivered into the magazine at the upper end and permitted to escape one at a time at the lower end, as usual in this class of machines. The lower ends of the magazines are beveled in a vertical plane to permit the unimpeded vertical movement of the escapements and other parts, subsequently to be described. Five magazines are shown in the present instance, each to contain a series or font of matrices differing from those in the other magazines. It will be observed that the magazines are constructed without escapements or means for controlling the escape of the matrices.

D represents a vertical back plate forming part of the assembling mechanism, and mounted to slide upward and downward in guides in the main frame, directly against the front ends of the magazines, in order to prevent the escape of the matrices from those magazines which are not for the moment in action. Through the back plate there is formed, as shown in Fig. 7, a horizontal slot or opening $d$, through which the matrices may escape from one magazine at the time when the plate is adjusted to bring this slot opposite the magazine, as shown in Figs. 2 and 7.

For the purpose of controlling the escape of the matrices one at a time from the various channels of the magazines, I employ a horizontal row or series of escapement devices, one for each channel. These escapements, consisting each of a latch or finger E, mounted on a horizontal pivot $e$, and a coöperating dog E' guided to slide upward and downward. The finger E is acted upon by a spring F, which serves to hold its rear end normally in an elevated position directly in front of the foremost matrix, as shown in Fig. 2, so that the escape of the matrix from the magazine is prevented. The dog E' is notched to receive the forward end of the latch E, in order to impart motion thereto, the notch being elongated vertically, so that lost motion is permitted between the two parts.

Normally the two escapement parts or members stand in the position shown in Fig. 2. When a matrix is to be discharged the dog E' moves upward until its end stands above the upper surface of the latch, and in the path of the outcoming matrix, as shown in Fig. 7. The rising movement of the dog E' continues until it lifts the forward end of the latch E, causing the rear end of the latter to move downward out of engagement with the matrix, so that the latter may pass forward out of the magazine, until arrested by the dog E', as shown in Fig. 7, the advanced matrix resting against and holding back the next matrix in the series, beyond the end of the latch E. The motion of the parts is now reversed, and the dog E' moved downward to release the forward matrix. As it descends, and before it releases the matrix, it releases the latch E, which is thrown upward to arrest the second matrix, and hold it within the magazine while the first matrix passes outward, over the dog E', to the assembling devices and to the line in course of composition, as hereinafter described. The dogs E' may be operated through any suitable connections from finger keys or other actuating devices. In the drawing they are connected by a sliding joint to the upper ends of vertically guided reeds G, hereinafter described in detail.

For the purpose of receiving matrices as they are discharged from the magazines, and delivering them to the line, I employ an assembling mechanism attached to, and movable upward and downward with, the plate D. This assembling mechanism comprises a channel plate consisting of two vertically connected plates H and H', and intermediate partition plates $h$, between which the matrices descend to the assembling belt or other carrier forming a part of the assembling mechanism, and serving to carry the matrices to the left, toward the assembler or holder in which the line is composed. It will also be noted that this channel-plate is pivotally movable about the horizontal shaft $q'$ on the back plate D in order to give access to the interior thereof or to the other parts, when desired, but is normally held in operative position by the hand latch $H^{10}$, see Fig. 8. In the present instance this carrier forming part of the assembling mechanism consists of an endless inclined, constantly driven belt I, arranged to travel around two supporting pulleys $i$ and $i'$. The lower end of the belt delivers the matrices over a guide $i^2$, into a vertical guide or passage $i^3$, through which they descend into a horizontal channel in the assembling elevator J, into which they are carried laterally, one after another, by a rotary star wheel K, this wheel and the assembler being essentially the same as in the Mergenthaler machines.

It is to be noted that the entire assembling mechanism, consisting of the carrier belt and the guides which direct the matrices to the belt from the magazines, and the connected parts, are all movable upward and downward with the back plate D in relation to the magazines, so that whenever the receiving slot in the plate D is in position to receive matrices from the magazine the assembling devices are in position to receive the matrices, in turn, and deliver them toward the assembler.

The carrier belt I may be made of any suitable form, with or without fingers or projections, and arranged at any suitable angle or inclination the details of this belt, and of the assembling devices, not being of the essence of my invention.

The reeds G which actuate the escapements are mounted in guides $g$, $g$, seated in the assembling mechanism, so that when the latter is moved upward and downward the reeds and their guides are also moved. The reeds G receive motion from reeds L, guided in the stationary main frame, and connected in any suitable manner with the finger keys, various mechanisms for this purpose being well known in the art. As the reeds G are adjusted upward and downward with the assembling mechanism, it is necessary that they shall be connected to and disconnected from the reeds L. To this end, the reeds G are provided with notches $g'$ equal in number to the magazines, and each adapted to receive the lateral projection on the upper ends of the reeds L. The reed guides $g$ are mounted to slide horizontally forward and backward, and are urged constantly forward by a spring $g^2$, so that when the guides are released the reeds G will be automatically brought forward and disconnected from the reeds L, as shown in Fig. 6.

For the purpose of moving the reeds G rearward, and reëngaging them, at one height or another, with the reeds L, two horizontal rock shafts M and M' are seated in the assembler frame, these shafts being flattened on one side, so that when turned to the position shown in Fig. 2 they will hold the reeds G backward, in engagement with the actuating reeds; and, on the other hand, when turned to the position shown in Fig. 6 they will permit the disengagement of the reeds.

For the purpose of effecting the movement of the assembling mechanism, I provide the means shown in Figs. 1, 2, and 3, consisting of a hand lever N, secured to one end of the shaft n, carrying a sector pinion O, which engages the pinion p on one end of the horizontal shaft P, which is seated in the main frame, and provided at its ends with gears $p^2$, engaging vertical racks $p^3$, secured to the assembler back plate D. When the hand lever is moved it imparts motion through the intermediate parts to the gears $p^2$, which in turn move the racks, thereby raising or lowering the entire assembling mechanism, the escapements, and the back plate D, so as to bring the said parts and their adjuncts into operative relation with one magazine or another. In other words, the movement of the hand lever serves to bring the matrix releasing and assembling devices in operative relation to one or another of the stationary magazines.

It will be observed that when the parts are in the position shown in Fig. 2, the foremost matrix in the magazine projects at its upper corner beyond the magazine, and into the slot of the back plate D. It is therefore necessary that this matrix shall be pushed back into the magazine, and beyond the rear face of the plate, before the escapements are shifted. I may employ for this purpose any suitable means, but I recommend the construction shown in Figs. 1, 2 and 6—in which Q represents a pusher plate lying across the front of the machine, and forming when in normal position part of the upper surface of the guide through which the matrices descend. This plate is connected to crank arms q, on a horizontal shaft q', seated in ears of the plate D. This rock shaft carries also arms $q^2$, connected by links $q^3$ (see Fig 1) to the crank arms $q^2$, on the rock shafts M and M', the latter being in turn provided with the hand crank R.

The parts stand normally in the position shown in Figs. 1, 2 and 3. Before the vertical shifting of the escapements is effected the lever R is turned down to the position shown in Fig. 6, the effect being to carry the pusher plate Q down to the position shown in Fig. 6, so that it pushes the protruding matrix backward into the magazine, and becomes in effect a continuation of the plate D, in order to prevent the matrices from any magazine from sliding forward as the plate D is carried upward and downward. The same action of the hand lever R also causes the shafts M and M' to be turned, in order to effect the disengagement of the escapement-actuating reeds G from the reeds L.

The parts just referred to remain in the position stated until after the vertical movement of the escapements and assembler has been effected by the hand lever N, after which the lever R is restored to its normal position, thereby withdrawing the plate Q and rotating the shafts M and M' to cause the movement of the reeds G into operative positions.

For the purpose of imparting motion to the assembling belt I may employ any suitable means. As shown in the drawings, Figs. 2 and 3, the shaft of the pulley r is provided with a bevel pinion $r^2$, engaging a second bevel pinion $r^3$, attached to a sprocket wheel $r^4$, which receives motion from an endless sprocket chain $r^5$, passing around pulleys $r^6$, mounted in the main frame, and driven by any suitable connections. As the escapements and assembler move upward and downward the sprocket wheel $r^4$ is carried up and down, retaining its engagement with the driving chain $r^5$, which will impart motion to the wheel regardless of its height.

While I prefer to locate the escapements below the path of the outgoing matrices, it will of course be understood that they may be employed above the path, to operate on the upper edge of the matrices, in which case the operating devices will be modified accordingly.

Although it is preferred to make the escapement in the form shown, it is to be understood that it may be widely modified within the range of mechanical skill, the only essential requirement being that the escapement shall have a double action, or, in other words, that it shall have two alternately acting surfaces, one to arrest the matrices within the magazine, and the other to momentarily retard the released and advanced matrix until the first surface has engaged the second matrix.

Having described my invention, what I claim is:

1. In a typographical machine, the combination of a plurality of magazines for the matrices, an assembler, conveying means for the matrices, and devices for guiding the matrices from a selected magazine to the conveying means, the said conveying means being adjustable to different vertical positions to correspond to the particular magazine in action.

2. In a typographical machine, the combination of a plurality of magazines for the matrices, any one of which may be selected, into action at will, the carrying belt adjustable vertically to correspond to the particular magazine in action, and means for imparting motion to said belt in its different adjusted positions.

3. In a typographical machine, the combination of a plurality of magazines for the matrices, any one of which may be brought into action at will, and the carrying belt, the said belt being adjustable to different vertical positions to correspond to the particular magazine in action.

4. In a typographical machine, the combination of a plurality of magazines for the matrices, an assembler, conveying means for delivering the matrices thereto and devices for guiding the matrices from a selected magazine to the conveying means, the conveying means being adjustable to different vertical positions to correspond to the particular magazine in action, together with a chute leading to the assembler and arranged to receive the matrices from the conveying means in any of their adjusted positions.

5. In a typographical machine, the combination of a plurality of inclined magazines, and a single series of escapements movable from one magazine to another, the lower ends of said magazines being beveled and having their beveled faces lying in the same plane in order to permit the escapements to move in a straight path.

6. In a typographical machine, the combination of a plurality of magazines, assembling devices movable from one to another of said magazines at will, and means for closing the ends of said magazines during the movement of said devices and movable therewith.

7. In a typographical machine, the combination of a plurality of magazines, assembling devices movable from one to another of said magazines, a cover plate to close the ends of all the magazines but one, and a second plate to close the end of the exposed magazine and movable at will from its operative position to permit the passage of the matrices from the said magazine both plates being connected to the said assembling devices and movable therewith.

8. In a typographical machine, the combination of a plurality of magazines, means for closing the ends of all the magazines but one, movable assembling devices coöperating with the exposed magazine, and means for closing the end of the exposed magazine before said devices are moved and then movable therewith.

9. In a typographical machine, the combination of a plurality of magazines, means for holding the matrices within all of said magazines except the one in service, movable assembling devices lying beyond the delivery ends of said magazines and coöperating with the one in service, and means for pushing a protruding matrix back into said magazine before said devices are moved and then movable therewith.

10. In a typographical machine, an escapement device comprising two members, each having a single matrix engaging portion, the said members being capable of an independent relative movement to effect the release of a matrix.

11. In a typographical machine, an escapement device comprising two members, each having a single matrix engaging portion and acting alternately to release and arrest the descending matrices, the said members being mounted independently and movable relatively to each other in their action.

12. In a typographical machine, an escapement device comprising two single matrix engaging members capable of independent relative movement, one pivotally mounted and the other slidingly mounted, and acting alternately to release and arrest the descending matrices.

13. In a typographical machine, an escapement device comprising two single matrix engaging members capable of independent relative movement, acting alternately to release and arrest the descending matrices, one of said members being pivotally mounted and the other slidingly mounted, and one controlled in its position by the other.

14. In a typographical machine, an escapement device comprising two relatively movable parts acting alternately to release and arrest the descending matrices, the said parts being so connected as to permit lost motion between them, whereby one is operatively moved in advance of the other.

15. In a typographical machine, the combination of a plurality of magazines, channeled matrix guiding means comprising front and back plates and intermediate partitions, and a supporting frame for said guiding means shiftable to register them with any selected magazine, and the said guiding means being movably connected to the supporting frame so as to permit them to be shifted out of operative position when desired.

16. In a typographical machine, the combination of a plurality of magazines, channeled matrix guiding means comprising front and back plates and intermediate partitions, and a supporting frame for said guiding means shiftable to register them with any selected magazine, and the said guiding means being pivotally connected to the supporting frame to permit them to be swung from their operative position when desired.

17. In a typographical machine, the combination of a plurality of magazines, assembling devices movable from one to another of said magazines at will, and means for pushing a protruding matrix back into one of the magazines, the said pushing means being movable with the said assembling devices from one into operative relation to another of said magazines.

In testimony whereof I hereunto set my hand this 13th day of November, 1911, in the presence of two attesting witnesses.

ROBERT O. BOARDMAN.

Witnesses:
 CHARLES H. LILLIE,
 JAY W. LINSEY.